United States Patent

[11] 3,572,893

| [72] | Inventors | Harold F. Bennett<br>Pasadena, Calif.;<br>Howard T. Betz, Chesterton, Ind.; Ronald<br>L. Ohlhaber; Donald A. Pontarelli,<br>Arthur V. Appel, Chicago, Ill. |
|---|---|---|
| [21] | Appl. No. | 815,688 |
| [22] | Filed | Apr. 14, 1969 |
| [45] | Patented | Mar. 30, 1971 |
| [73] | Assignee | The United States of America as represented by the Secretary of the Navy |

[54] STEROSCOPIC IMAGE DISPLAY DEVICE
2 Claims, 2 Drawing Figs.

[52] U.S. Cl. ................................................. 350/130,
350/96, 350/131, 350/137, 350/138
[51] Int. Cl. .................................................. G02b 27/22
[50] Field of Search .......................................... 350/96 (B), 130, 131, 136, 137, 138, 144

[56] References Cited
UNITED STATES PATENTS

| 3,519,827 | 7/1970 | Chitayat | 250/202 |
| 3,205,303 | 9/1965 | Bradley | 350/131UX |
| 3,244,878 | 4/1966 | Stein et al. | 250/60 |
| 3,447,854 | 6/1969 | Minter | 350/131 |
| 3,493,284 | 2/1970 | Cole | 350/96X |

*Primary Examiner*—David Schonberg
*Assistant Examiner*—Paul R. Miller
*Attorneys*—Edgar J. Brower, H. H. Losche and Paul S. Collignon ABSTRACT: An image display system for an aircraft having first and second fiber optic bundles connecting separate periscopes and projection lens and having a first mirror for reflecting images from said projection lens to a spherical mirror which reflects these images into the eyes of an observer.

PATENTED MAR 30 1971　　　　　　　　　　　3,572,893

INVENTORS
ARTHUR V. APPEL
HAROLD F. BENNETT
HOWARD T. BETZ
RONALD L. OHLHABER
DONALD A. PONTARELLI

BY H. H. Loacke
Paul S. Collignon

ATTORNEYS

STEROSCOPIC IMAGE DISPLAY DEVICE

BACKGROUND OF THE INVENTION

The present invention relates to a display system suitable for use in an aircraft for viewing an area that is normally not in an observer's line of sight. For example, the area being viewed might be behind, beneath, or to the side of an observer.

Various devices have, in the past, been employed to provide views of remote areas by an observer. For example, in U.S. Pat. No. 3,205,303, which issued Sept. 7, 1965, to William E. Bradley, there is shown an indicator which is attached to a helmet of an observer. Position-sensing means are maintained in predetermined positions with respect to the observer's head to control the position of a remote pickup. The remote pickup supplies a video signal to the indicator which causes the indicator to display a scene viewed by the pickup.

Another remote viewing device is shown in U.S. Pat. No. 3,244,878, which issued Apr. 5, 1966, to Edward S. Stein and Ralph R. Stevenson. This device provides for the remote viewing of a stereoscopic X-ray picture which is transmitted to a viewer by means of a flexible light transmitting conduit. The unit provides a three-dimensional X-ray image while at the same time allowing for the convenience and safety of the operator by permitting him to view the picture free from the danger of exposure to radiation.

SUMMARY OF THE INVENTION

One of the important design requirements for any aircraft cockpit device is that the device be kept small so as to utilize a minimum of space and add a minimum of weight. Smallness is desired so that a large number of devices can be used and so that one device will not block the view of another.

In the present invention, a stereoscopic picture is presented for viewing in an aircraft cockpit without the necessity of having a viewer or display panel which could block an observer's view. A pair of optical pickups such as periscopes, are positioned in the direction of an area to be viewed, and fiber optic bundles are used to transmit the stereoscopic image to a first mirror which then reflects the stereoscopic image to a spherical mirror. The radius dimension of the spherical mirror is chosen such that the center of the sphere would be approximately where an observer's eyes would be positioned. The spherical mirror then forms two exit pupils in front of the mirror where the observer positions his eyes to see the stereoscopic image.

It is therefore a general object of the present invention to provide an improved device for viewing a stereoscopic image of a remote area which is normally not in the line of view of an observer.

Other objects and advantages of the present invention will be readily appreciated as the same becomes better understood by reference to the following detailed description when considered in connection with the accompanying drawing.

DESCRIPTION OF THE PREFERRED EMBODIMENT

Figure 1:
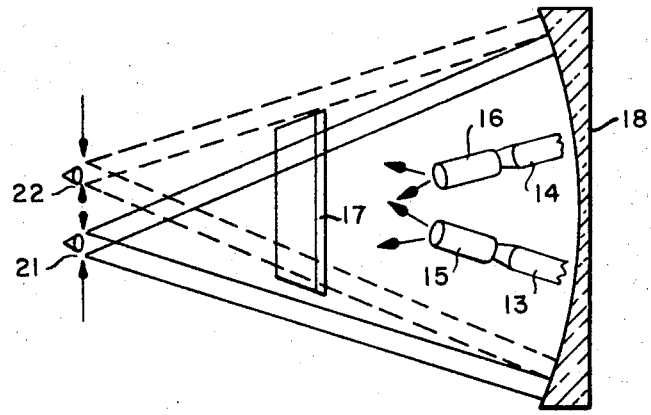
FIG. 1 is a diagrammatic top view of a preferred embodiment of the present invention.

Referring now to the drawing, there are shown two optical pickups 11 and 12, which might be periscopes, or the like, the fiber optic bundles 13 and 14 connect pickups 11 and 12 to projection lens 15 and 16, respectively. Lens 15 and 16 project a stereoscopic image on the surface of mirror 17 which, in turn, reflects the image to aspheric mirror 18. The curvature of mirror 18 is such that two exit pupils 21 and 22 are formed in front of mirror 18 at a position approximately where an observer's eyes would be positioned. An observer, by positioning his eyes near exit pupils 21 and 22 obtains a stereoscopic view at the area to which optical pickups 11 and 12 are directed.

Although two fiber optic bundles 13 and 14 are shown in the drawing, it is feasible to employ a single fiber optic bundle and use a time sharing technique. Such a time-sharing system is shown and described in U.S. Pat. No. 3,303,739, which issued Feb. 14, 1967, to Anwar K. Chitayat.

Figure 2:
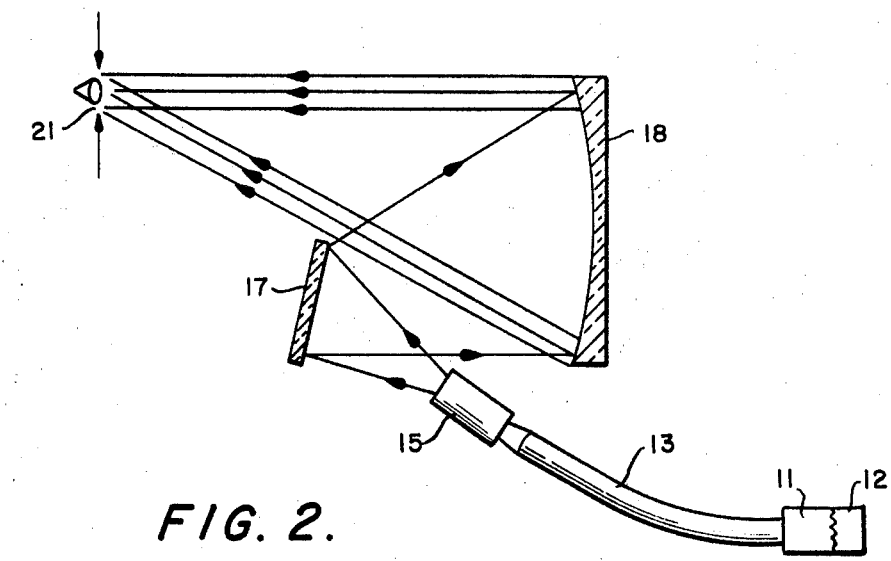
FIG. 2 is a diagrammatic side view of the embodiment shown in FIG. 1 of the drawing, partially broken away to show a second optical pickup.

As shown in FIGS. 1 and 2 of the drawings, the present invention permits stereoscopic vision of a remote area without having any obstructions near an observer's head and without interfering with normal observer function, such as piloting an aircraft. The present invention permits full and continuous vision in a forward direction.

We claim:

1. A stereoscopic device for viewing a remote area comprising, first and second optical pickups oriented in the direction of said remote area, a first reflecting mirror, first and second projection lenses for projecting an image from said optical pickups to said first reflecting mirror, said first projection lens being optically coupled to said first optical pickup by a first fiber optic bundle, said second projection lens being optically coupled to said second optical pickup by a second fiber optic bundle, and an aspheric mirror positioned to receive images from said first reflecting mirror and reflect said images to first and second exit pupils whereby an observer can position his eyes near said exit pupils to obtain stereoscopic vision of said remote area.

2. A stereoscopic device for viewing a remote area as set forth in claim 1 wherein said first and second optical pickups are periscopes.